(12) United States Patent
Luchini et al.

(10) Patent No.: US 8,851,131 B2
(45) Date of Patent: Oct. 7, 2014

(54) SKEW SYMMETRIC NON-PNEUMATIC TIRE

(75) Inventors: John R. Luchini, Findlay, OH (US); Alan D. Wanstedt, Findlay, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 1051 days.

(21) Appl. No.: 12/924,180

(22) Filed: Sep. 22, 2010

(65) Prior Publication Data
US 2011/0290394 A1    Dec. 1, 2011

Related U.S. Application Data

(60) Provisional application No. 61/396,763, filed on Jun. 1, 2010.

(51) Int. Cl.
*B60C 7/10* (2006.01)
*B29D 30/02* (2006.01)

(52) U.S. Cl.
CPC ............ *B60C 7/10* (2013.01); *B60C 2007/107* (2013.01); *B29D 30/02* (2013.01)
USPC ............................ 152/324; 152/246; 152/301

(58) Field of Classification Search
CPC ...... B60C 7/10; B60C 7/102; B60C 2007/107
USPC ......... 152/1, 5, 7, 11, 12, 246, 323, 324, 326, 152/300, 301, 302
See application file for complete search history.

(56) References Cited

U.S. PATENT DOCUMENTS

| | | | |
|---|---|---|---|
| 1,641,150 A * | 9/1927 | Brubaker | 152/324 |
| 2,603,267 A * | 7/1952 | Simpson | 152/7 |
| 3,003,534 A | 10/1961 | Cousins | |
| 3,750,733 A | 8/1973 | Brewer et al. | |
| 4,784,201 A * | 11/1988 | Palinkas et al. | 152/323 |
| 4,832,098 A | 5/1989 | Palinkas et al. | |
| 4,921,029 A | 5/1990 | Palinkas et al. | |
| 4,934,425 A * | 6/1990 | Gajewski et al. | 152/323 |
| 4,944,563 A | 7/1990 | Pinchbeck et al. | |
| 4,945,962 A | 8/1990 | Pajtas | |
| 5,023,040 A | 6/1991 | Gajewski et al. | |
| 5,050,656 A | 9/1991 | Ho | |
| 5,174,634 A | 12/1992 | Blanck et al. | |
| 5,223,599 A * | 6/1993 | Gajewski | 528/59 |
| 5,265,659 A * | 11/1993 | Pajtas et al. | 152/329 |

(Continued)

OTHER PUBLICATIONS

International Search Report; Date of Mailing: Nov. 15, 2010.

(Continued)

*Primary Examiner* — Kip T Kotter
(74) *Attorney, Agent, or Firm* — Emch, Schaffer, Schaub & Porcello Co., LPA (57) ABSTRACT

This skew-symmetric non-pneumatic tire focuses on the mechanical aspects of the design of the design to solve problems associated with the ride comfort, durability and assembly of a non-pneumatic tire. The tire has a generally cylindrical hub surrounding the axis of rotation and a generally cylindrical outer surface sharing the common axis of rotation; a pair of disk-like side wall members comprising non-buckling webs extending between and mating with their respective hub and outer cylindrical surface; said pair of side wall members have webs sharing a common configuration resulting in an assembly with a skew-symmetric structure with respect to the loading direction; and a tread-band circumscribing the cylindrical outer surfaces of the side walls.

4 Claims, 8 Drawing Sheets

(56) References Cited

U.S. PATENT DOCUMENTS

| | | | |
|---|---|---|---|
| 5,460,213 A * | 10/1995 | Pajtas | 152/11 |
| 5,743,316 A | 4/1998 | Chrobak | |
| 6,298,891 B1 | 10/2001 | Harris | |
| 6,374,887 B1 | 4/2002 | Subotics | |
| 6,491,081 B2 | 12/2002 | Kuroda et al. | |
| 6,640,859 B1 | 11/2003 | Laurent et al. | |
| 6,719,025 B2 | 4/2004 | Caretta et al. | |
| 6,994,134 B2 | 2/2006 | Grah | |
| 7,013,939 B2 | 3/2006 | Rhyne et al. | |
| 8,091,596 B2 | 1/2012 | Louden | |
| 2001/0020510 A1 | 9/2001 | Kuroda et al. | |
| 2002/0033212 A1 | 3/2002 | Caretta et al. | |
| 2002/0092589 A1 * | 7/2002 | Katoh et al. | 152/157 |
| 2002/0096237 A1 | 7/2002 | Burhoe et al. | |
| 2007/0119531 A1 * | 5/2007 | Steinke et al. | 152/324 |
| 2007/0267116 A1 | 11/2007 | Rhyne et al. | |
| 2008/0053586 A1 | 3/2008 | Hanada et al. | |
| 2009/0107596 A1 * | 4/2009 | Palinkas et al. | 152/209.1 |
| 2009/0211675 A1 | 8/2009 | Louden | |
| 2009/0211677 A1 * | 8/2009 | Palinkas et al. | 152/209.1 |
| 2010/0108215 A1 * | 5/2010 | Palinkas et al. | 152/324 |
| 2011/0024008 A1 * | 2/2011 | Manesh et al. | 152/5 |
| 2011/0108173 A1 | 5/2011 | Abe | |

OTHER PUBLICATIONS

International Preliminary Report on Patentability; dated Dec. 13, 2012.

* cited by examiner

SKEW SYMMETRIC NON-PNEUMATIC TIRE

The present patent application is based upon and claims the benefit of provisional patent application No. 61/396,763 filed Jun. 1, 2010.

FIELD OF THE INVENTION

This invention relates to a skew symmetric non-pneumatic tire having a unique side wall structure. In another embodiment, the invention relates to a method for producing the skew symmetric non-pneumatic tire using a single sidewall mold.

BACKGROUND OF THE INVENTION

Prior to the present invention, a non-pneumatic tire relied primarily on the durability and processing ability of the materials for tire durability and manufacturability, in order to attain the ride comfort, durability, and wear advantages of pneumatic tires. The overriding advantage of a pneumatic tire is the cushioning it provides. Previously no mechanical design for a non-pneumatic tire is reliable and rugged enough to withstand the rigors of normal operation when mounted on the wheel of an automobile. Prior non-pneumatic tire have relied on special materials to provide the durability expected from a pneumatic tire; or they have deemed shorter life acceptable trade off for the other advantages of the non-pneumatic tire. An advantage of a non-pneumatic tire is that they cannot go flat from lack of inflation pressure. The main disadvantage of the pneumatic tire is that, after being punctured, a deflated tire cannot run flat without damaging the tire. In the past, non-pneumatic tires have been routinely used on vehicles where cushioning the load is not a prime consideration. Even so, the use of non-pneumatic tires in such applications was less than satisfactory because prior art non-pneumatic tires had undesirable handling characteristics.

One attempt to correct this was to provide the non-pneumatic tire with supporting and cushioning members that deform and buckle during operation. Buckling is generally a behavior to be avoided in structural design for two reasons. First, the bi-modal stiffness, or bifurcated behavior, makes it difficult to predict the response for general loading. Second, the stresses, and strains, that suddenly appear at buckling tend to be much more severe than the strains prior to buckling.

SUMMARY OF THE INVENTION

The principle novelty for this invention is the use of two copies of a single, molded, sidewall portion for a non-pneumatic tire creating a skew-symmetric structure that is both more durable and more flexible than other non-pneumatic tire configurations while simultaneously providing a simplified method of manufacture.

The insight stimulating this innovation was the need for a more compliant and durable non-pneumatic tire design which would also be relatively easy to manufacture, and re-manufacture. The embodiment of this novel design is based on a shape similar to the shell of a sea creature called the nautilus and the structure that would result if two such shells were connected on opposing sides of a non-pneumatic tire. This skew-symmetric non-pneumatic tire focuses on the mechanical aspects of the design to solve problems associated with the durability and assembly of a non-pneumatic tire.

The major insights stimulating the innovation was the desired simplicity for manufacture provided by separable sidewall portions, and the resulting novel design geometry has features that are commonly associated with the Wilberforce Pendulum. The ability of the structure to store elastic, mechanical, energy in two modes (bending/extension/compression mode and twisting/torsion mode), provides for a greater ability to carry loads with reduced stress for improved durability and better shock-energy absorption for improved ride comfort.

The invention has many potential applications in situations where durability and off-road mobility are important. One such application is for use in military vehicles and another is for off-road recreational vehicles.

The multi-mode energy storage principle of the Wilberforce pendulum is incorporated with skew-symmetric "nautilus" style molded sidewall portions. In addition, the sidewall portions will incorporate a gear-tooth interlocking configuration for the tread-band portion, and a sidewall-web-to-tread-band interface that is nominally parabolic and optimized for minimum shear stress on the interface using computer modeling techniques. The term "wheel spider" as used herein is defined as the portion of a wheel between the axle hub and the rim. The wheel spider would include the supporting features needed to carry the vertical load from the tread band, through the skew-symmetric webbing, to the axle hub. The wheel spider would also have lateral load supporting features similar to the "locking methods" prescribed for the tread band on the webbing. Wheel spider technology is known in the art and the load supporting interface between this non-pneumatic tire and the wheel spider could be enhanced through application of the technology used for the tread-to-web interface of this non-pneumatic tire. There may be other means to accomplish this load support.

The sidewall portions would be created from the same mold configuration and then mechanically attached together with bolts, a bayonet lock, an adhesive, or any similar mechanism of attachment. The sidewall portions would also provide a circumferential support and lateral locking mechanism. An adhesive on the mating surface, may be used to maintain intimate contact between the tread-band and the sidewall portions. The specific configuration of the mating surface would be computer designed to provide a shear stress that is below the limitations of the materials, or adhesive if used, at that surface.

Other objects and advantages of the present invention will become apparent to those skilled in the art upon a review of the following detailed description of the preferred embodiments and the accompanying drawings.

DETAILED DESCRIPTION OF THE INVENTION

The skew-symmetric, non-pneumatic tire 40 of this invention which is rotatable about an axis comprises a generally cylindrical hub 46 surrounding the axis of rotation and a generally cylindrical outer surface 48 sharing the common axis of rotation. See FIG. 4. A pair of disk-like side wall members comprises non-buckling webs extending between and mating with their respective hub and outer cylindrical surface. The pair of side wall members has webs sharing a common configuration resulting in an assembly with a skew-symmetric structure with respect to the loading direction. A tread-band circumscribes the cylindrical outer surfaces of the side walls. The webbing provides a smooth tangential transition between inner and outer cylindrical surfaces to create a non-buckling structure with smoothly deforming web members.

In one embodiment, the webbing comprises sections of a "logarithmic spiral" structure. In another embodiment, the webbing comprises sections of a "growth spiral". In still another embodiment, the webbing is a nautilus type webbing.

The assembly is configured such that the webbing of each side wall member has the same visual image as the other side wall when rotated about the axis of loading, i.e. "anti-symmetric" or "rotationally symmetric". The assembly is configured such that the webbing of each side wall member can twist on an axis of loading without buckling. The assembly also is configured such that the webbing of each side wall member has an opposing configuration to that of the other side wall. In one embodiment, the webbing of each side wall member has an uneven spacing between webs in order to reduce the tonality of noise generated by the webbing. Further, the side wall members may be assembled with an additional axial rotation in order to reduce both noise and irregularity in load support generated by the web spacing. Further, the webbing of each side wall member may be assembled to the axially inboard side of the assembly in order to reduce interaction of the webbing with the air and thus further reduce noise generated during rolling. In an alternative version with the webbing on the axially outboard side of the assembly, the webbing of each side wall member may have a covering disk, of suitable material and structure, on its axially outer side in order to reduce interaction of the webbing with the air to reduce noise generated by rolling. Still another alternative version with the webbing on the axially outboard side of the assembly would have the outermost portion of the webbing filled-in-place with a suitable low modulus material, for example sponge rubber, to reduce interaction between the webbing and the air to reduce noise generated by rolling. If desired, prior art irregular spacing and sponge rubber filled grooves can be appropriately combined.

Regarding the skew-symmetric non-pneumatic tire of this invention, the "nautilus" type webbing would be in an opposing configuration on the reverse side of the wheel. The interface between the "tread-band" and the outer web of the sidewall portions would be in a computer-assisted-design configuration so the peak interfacial shear stress is below the material and adhesive limits. The "tread-band" would have a variable thickness to meet the constraints imposed by the stress-minimized interface to the wheel and the requirements for the outer Road-contact portions of the tread. The "tread-band" will be "locked-in" by the sidewall portions using one or more of the techniques (gear toothed, crenellated, or press-fit) as described below.

Figure 1:
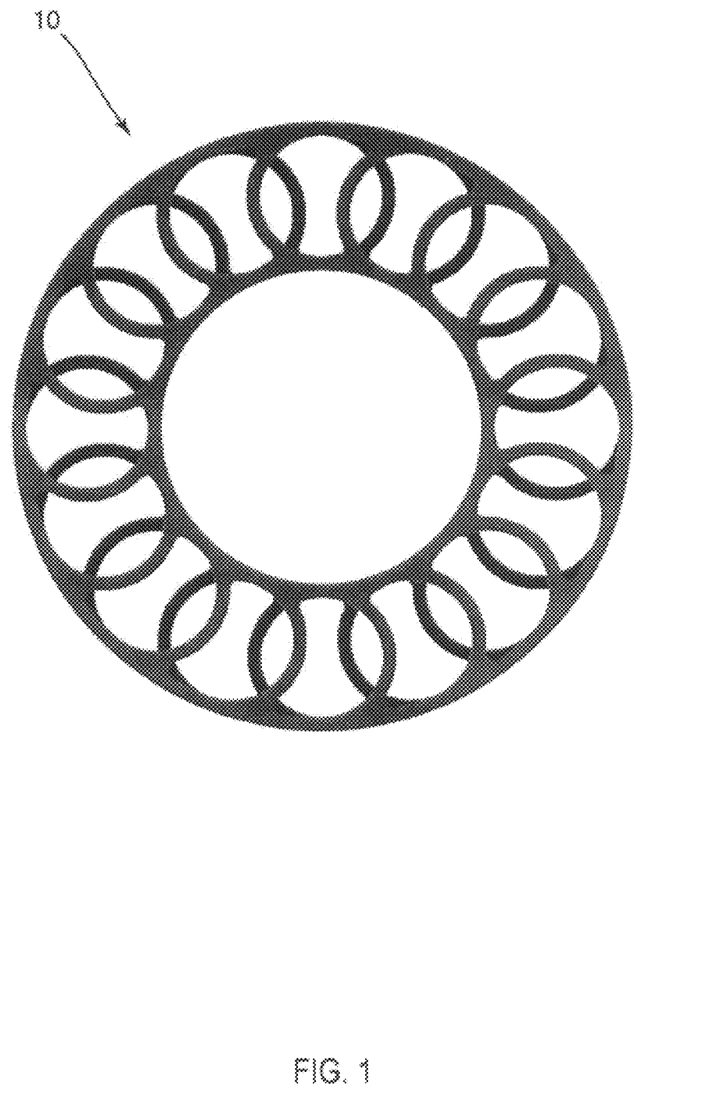
FIG. 1 is an undeformed side view of the skew-symmetric non-pneumatic tire (non-pneumatic tire) of this invention. The tread band and wheel spider are removed for clarity.

FIG. 1 is an undeformed side view of the skew-symmetric non-pneumatic tire 10 of this invention. The tread band and wheel spider are removed for clarity.

The term skew symmetry, or skew symmetric, is used in linear algebra and theoretical physics to describe a specific property of matrices or tensors. Skew symmetric is interchangeable with the adjective anti-symmetric. It is usually applied to the transpose of a matrix that causes a sign change.

The term must be distinguished from mirror symmetry (or bilateral symmetry) which is applied to the view that appears in a reflection. However, the term is similar to rotational symmetry. The distinction is that, in general, rotational symmetry is applied to objects that appear the same after a certain amount of rotation. If the object appears the same after specifically 180° rotation, then the rotational symmetry about the axis is skew-symmetry also referenced to the same axis.

Figure 2:
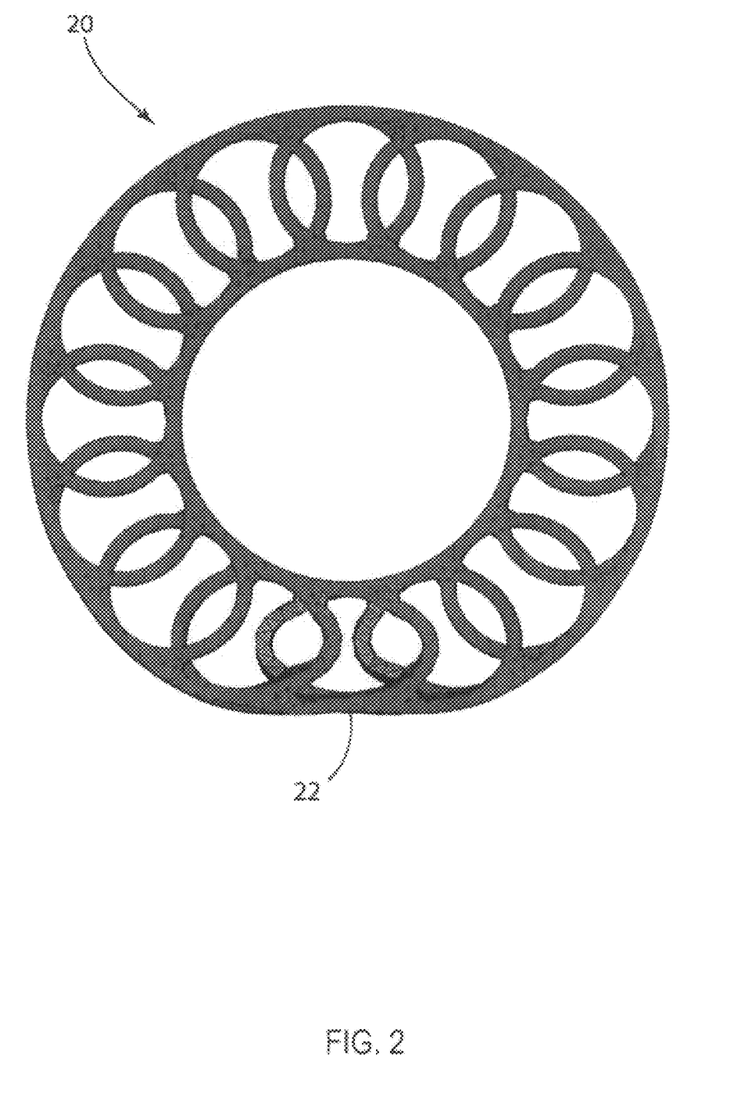
FIG. 2 is a side view showing the deformed side of the skew-symmetric non-pneumatic tire of this invention. The tread band and wheel spider are removed for clarity.

FIG. 2 is a side view showing the deformed skew-symmetric non-pneumatic tire 20 of this invention. The tread band and wheel spider are removed for clarity. The deformed sidewall shows edge 22 of the outer surface lifting off the road, which would be ameliorated by the tread band and the wheel spider. Note also that the wheel was analyzed as two (separate) wheel halves so the stresses are discontinuous at the centerline. This stress discontinuity would also be ameliorated by the tread band.

Figure 3:
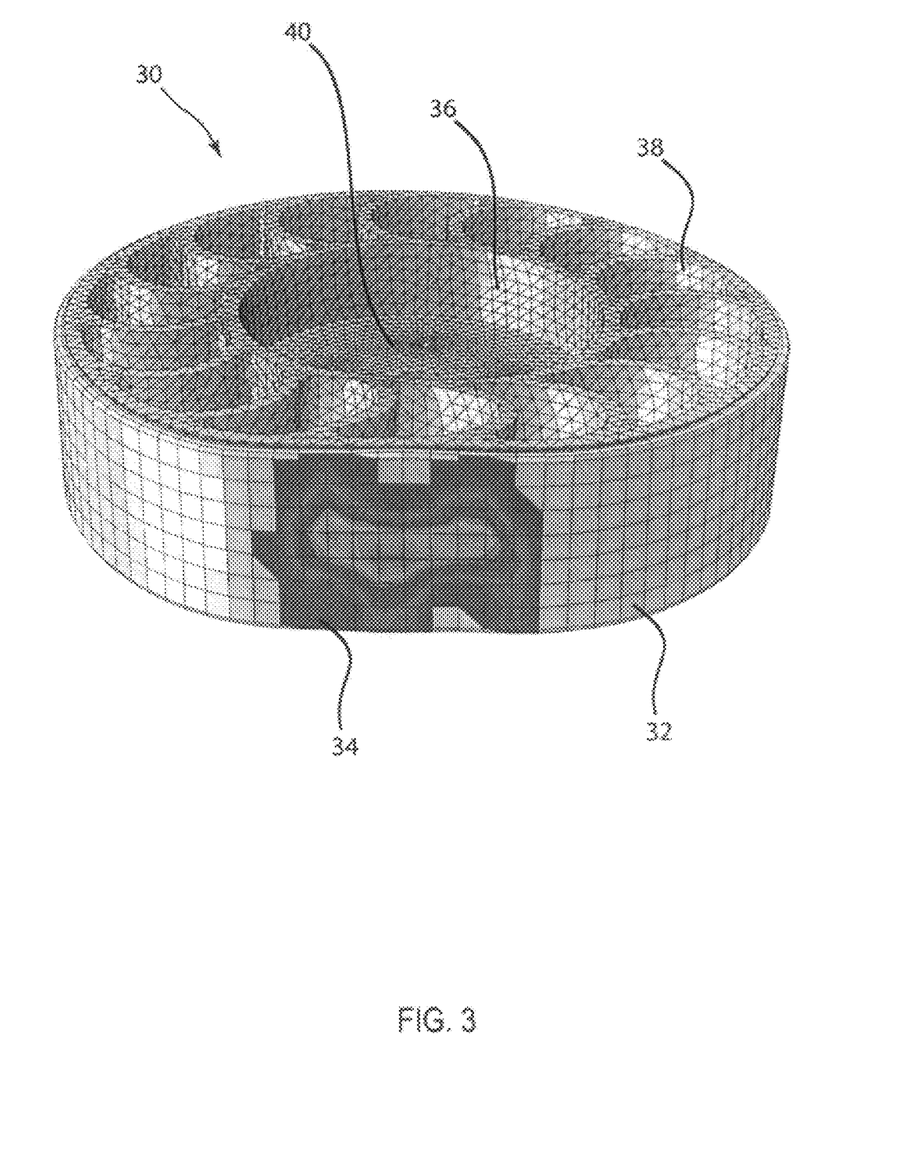
FIG. 3 shows the footprint pressure view for the deformed non-pneumatic tire of this invention.

FIG. 3 shows the footprint pressure view of the non-pneumatic tire 30 of this invention. For this view, tread band 32 was included. Resulting footprint stress pattern 34 clearly shows the skew symmetry that develops.

FIG. 2 and FIG. 3 show the desired response of the non-pneumatic tire that will enable it to mimic the load carrying and tractive behavior of a pneumatic tire. This is the result of a skew-symmetric structure that stores elastic energy of deformation in both torsion and bending. This is not a result of buckling behavior, which would necessarily be much less predictable. A non-pneumatic tire utilizing skew symmetry and the same materials will provide better service than a non-pneumatic tire that suffers a buckling behavior in its structure. This is due to the stress (and strain) concentration that will occur in regions that buckle over the nominal stress (and strain) in those regions prior to buckling.

FIG. 3 also shows "wheel spider" 36 which is not the subject of the patent. In particular, wheel spider 36 would include the supporting features needed to carry the vertical load from tread band 32, through skew-symmetric webbing 38, to axle hub 40. Wheel spider 36 would also have lateral load supporting features similar to the "locking methods" prescribed for the non-pneumatic tire tread band 32 on the non-pneumatic tire webbing 38. The technology for attaching the tread band to the webbing for this non-pneumatic tire could be applied to the interface between the non-pneumatic tire and the wheel spider. There are other means to accomplish this load support that are known to those skilled in the art.

Figure 4:
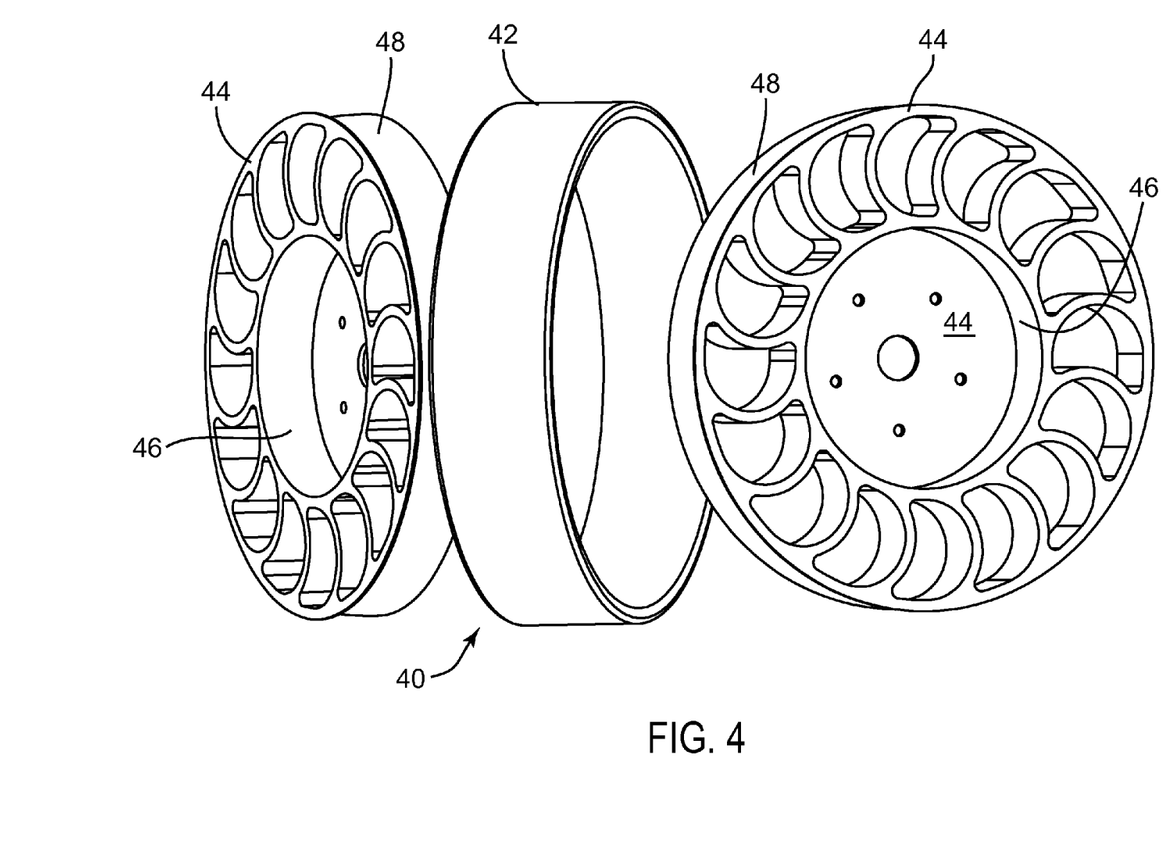
FIG. 4 shows splayed wheel halves and the tread band illustrating how a single mold can produce both sides of the skew-symmetric non-pneumatic tire of this invention.

FIG. 4 shows splayed wheel halves and the tread band illustrating how a single mold may produce the skew-symmetric non-pneumatic tire 40 of this invention. Use of a single mold is not a requirement. Often, multiple molds may be used in a large manufacturing operation.

Tread-band portion 42 may contain internal reinforcing elements of compatible materials and/or a supporting hoop structure at the interface with the sidewall portions. Webbed sidewall portions 44 come together to capture tread-band portion 42 mechanically. The interface surface shape is computer-designed to minimize the shear stresses on the surface of the interface. The interface may utilize a separate supporting hoop structure, a separate structural material, or a tertiary adhesive material. The section view is only for the sidewall portions near the tread-band. Sidewall portions 44 then may be mounted to an axle through wheel spider 46.

Figure 5:
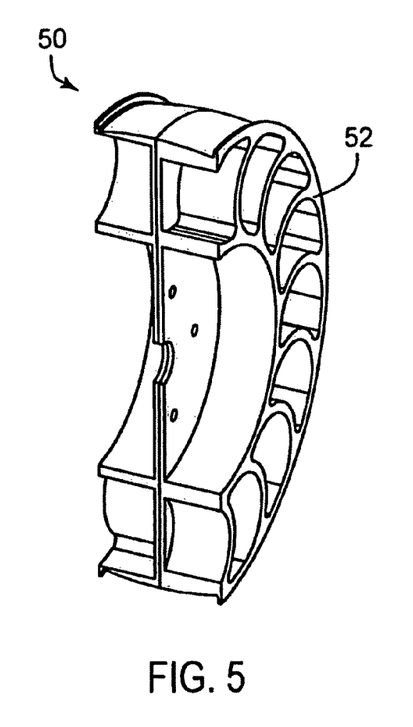
FIGS. 5, 6 and 7 are isometric cross sectioned views and a cross sectioned layout view, with tread band removed, of the skew-symmetric non-pneumatic tire of this invention.
Figure 6:
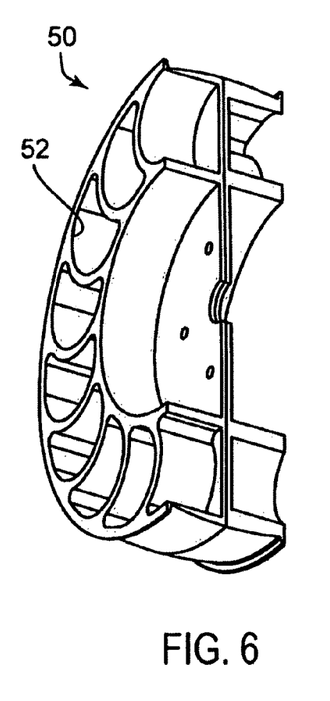
Figure 7:
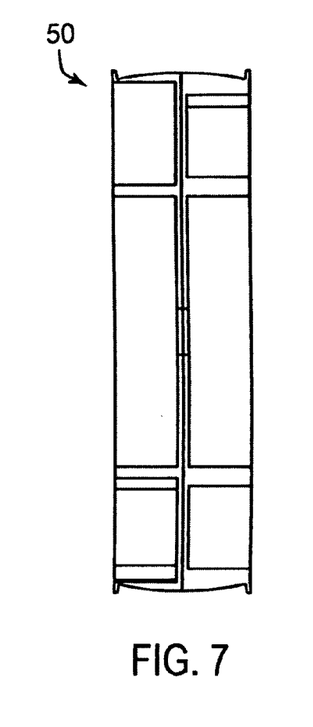

FIGS. 5, 6 and 7 are sectioned isometric layout views and a cross section view of the skew-symmetric non-pneumatic tire 50 of this invention with tread band removed. These views show how the sidewall portions would be created from the same mold configuration and then mechanically attached together with bolts, a bayonet lock, an adhesive, or any similar mechanism of attachment, which are not shown explicitly. The multi-mode energy storage principle is incorporated with skew-symmetric "nautilus" style molded sidewall portions 52.

Figure 8:
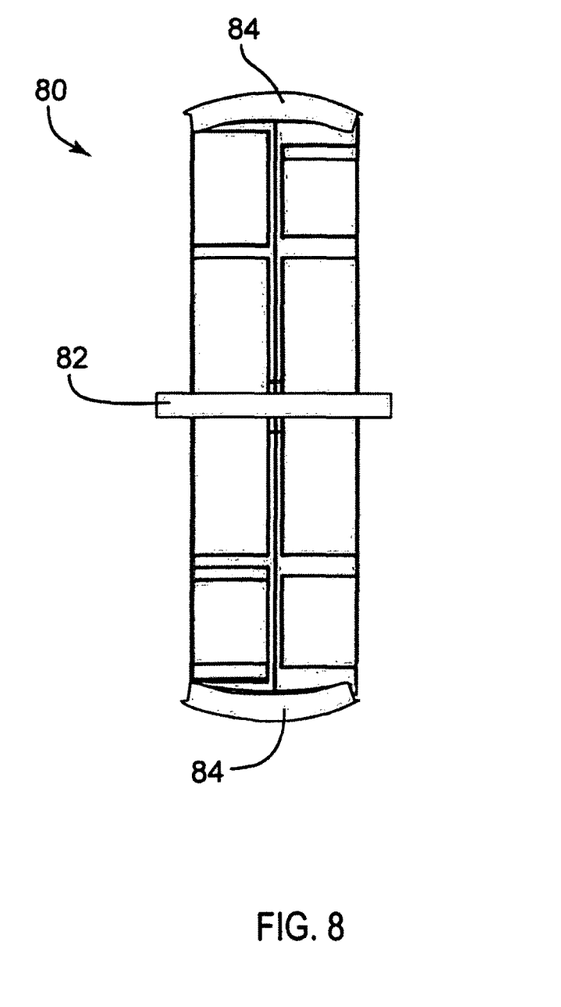
FIG. 8 shows the tread band as mounted on the skew-symmetric non-pneumatic tire sidewalls of this invention.

FIG. 8 now shows a section view of the skew-symmetric non-pneumatic tire 80, as shown in FIG. 7, with axle 82 shown and separable tread band 84 placed on the webbed portion of the invention. The sidewall portions of the wheel of the non-pneumatic tire would provide the means for transferring support of the vehicle load through the axle to the tread band and then to the road. In addition, the sidewall portions would also provide for one or more locking mechanisms. The sidewall portions of the wheel may provide a compression fit via the lateral support surface as shown in FIG. 8. The non-pneumatic tire-to-spider interface may use the technology revealed in this specification for the tread-to-web interface. The support surface may incorporate a gear-tooth interlocking configuration to mate with the lateral edges of the tread-band portion. The sidewall portions may also provide for a crenellated interface at the support surface as shown in FIG. 8. An adhesive on the lateral and/or circumferential mating surfaces could be used to maintain intimate contact between the tread-band and the sidewall portions.

Figure 9:
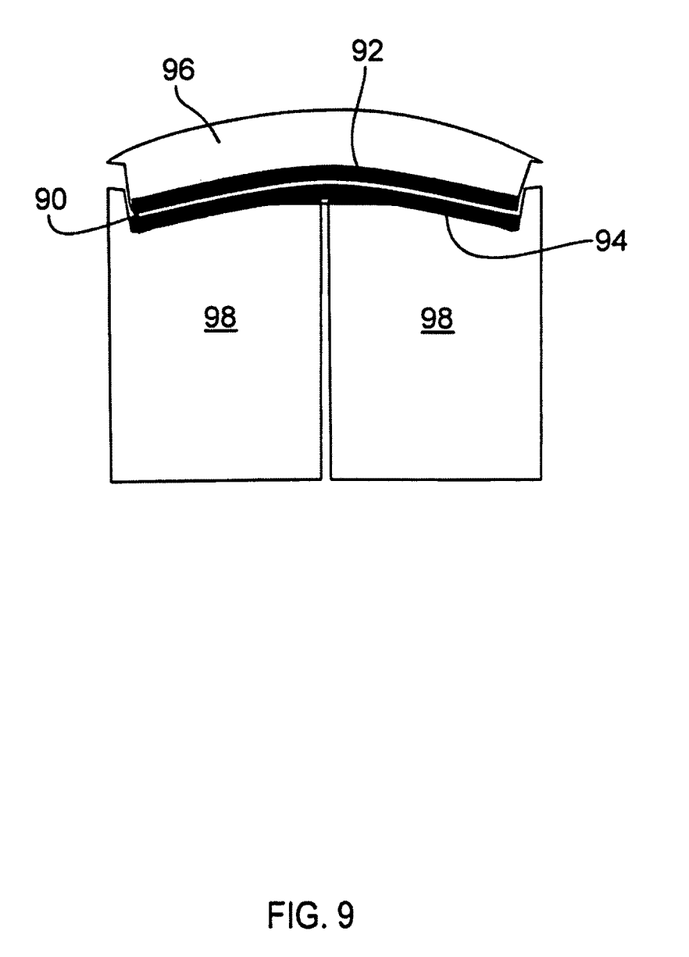
FIG. 9 shows a section through the tread band and the adjacent interface between the wheel and the tread band. The interface region itself is highlighted in FIG. 9 and is highlighted in subsequent FIGS. 10 through 12.

FIG. 9 shows the interface between the wheel and the tread band. Interface 90 of interest is illustrated by two adjacent, thick, curved, colored lines 92 and 94 in FIG. 9. The creation of the specific surface of this invention will now be described. The specific configuration of the mating surface would be designed to provide a shear stress that is below the limitations of the materials, or adhesives, at that surface. The non-pneumatic tire-to-spider interface 90 may use the technology revealed in this specification for the tread-to-web interface.

The tire with a separable tread band 96 has interface 90 between the separable tread band 96 and supporting structure 98. The shape of the interface is designed to reduce the interfacial shear stress to a level below the adhesive/cohesive limit of the respective materials adjacent to the interface. This limiting stress value could be the material "ultimate" stress or a "cyclic" stress for a given cycle-life; this limiting stress is not the subject of the patent as it relates to the materials themselves in the application. In one embodiment the "singly curved" cylindrical surface would be more useful with materials and adhesives that have not yet been invented. The interface may comprise a singly curved (cylindrical) contacting surface. In another embodiment, the interface may comprise a doubly curved geometric contacting surface such as a parabolic/cylindrical or hyperbolic/cylindrical surface. The preferred contact surface has been found to be a general doubly curved contacting surface without a closed form geometric description, for certain available materials.

The general form of the interface surface cannot be expressed as a mathematically closed form geometric shape. As a result, the preferred contact surface is obtained through experimental iterations from a starting surface that may be a singly or doubly curved geometric surface and the shape of the final contacting surface is dependent upon the specific materials at the interface and their properties including the limiting stress for the materials. The experimental iterations may be complemented by or replaced with other techniques to accomplish the same result.

FIG. 9 illustrates a cross section view of an example of the ideal surface profile for the interface between the tread band and its supporting, skew-symmetric, sidewall structure which has been obtained for a certain combination of materials. The specific profile needed will be dependent on the properties of the materials at either side of the interface, as well as the geometric envelop of the structure. The mathematical operations needed are shown for an example set of parameters.

Example Parameters:
Tire Vertical Load: 1000
Tread Band Outer Diameter: 25
Tread Band Inner Diameter: 24
Tread Band Width: 5
Tread Band Material:
Modulus=1,000
Poisson's Ratio=0.49
Shear Strength=1,000
Sidewall Material:
Modulus=1,000,000
Poisson's Ratio=0.33
Shear Strength=50,000

Figure 10:
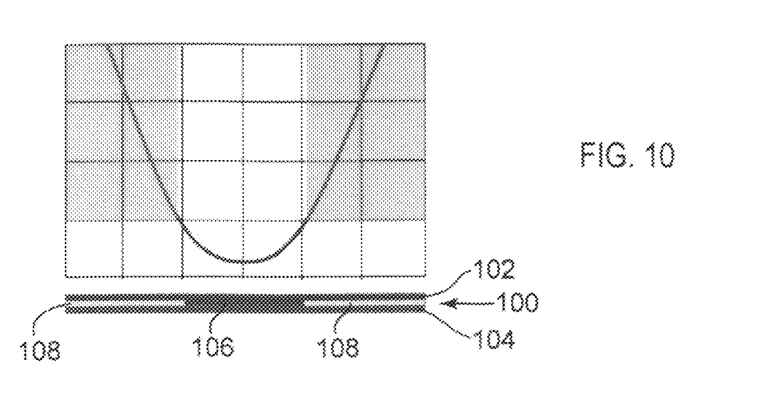
FIG. 10 shows a singly curved (cylindrical) contacting surface, as the first iteration of the method to be described. In this illustration, the shear stress limit is exceeded within the material interface and separation forms.
Figure 11:
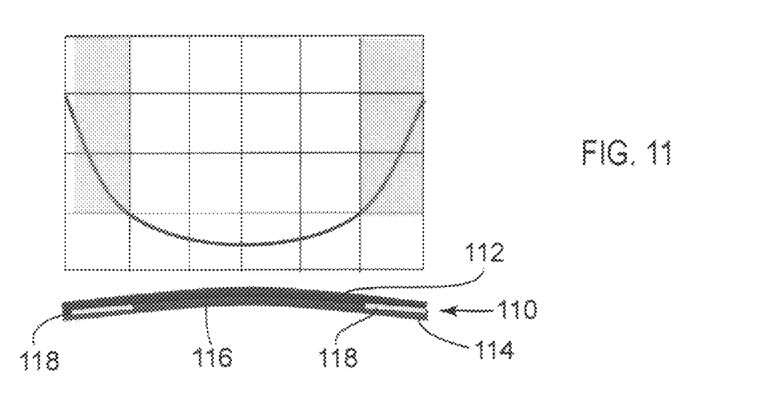
FIG. 11 shows a doubly curved (parabolic/cylindrical) contacting surface, as a subsequent iteration of the method to be described. In this illustration, the shear stress limit is again exceeded within the material interface and separation forms at the interface.
Figure 12:
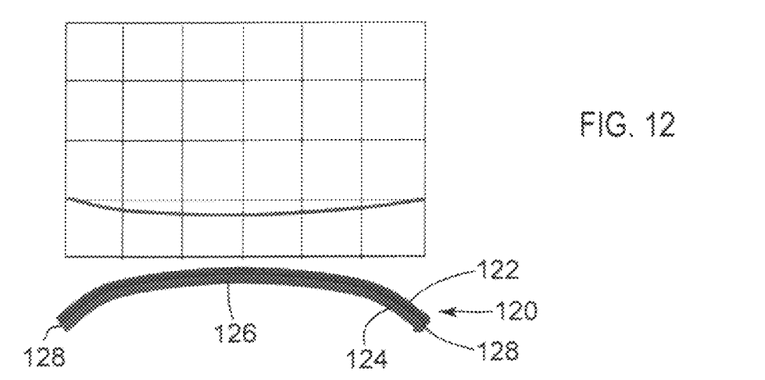
FIG. 12 shows the doubly curved (hyperbolic/cylindrical) contacting surface, as a final iteration of the method of this invention. In this illustration, the shear stress never exceeds the limit within the material interface and separation does not occur.

The design of this interface between the wheel and tire is described in FIGS. 10-12. The interface will be represented by the image from FIG. 9 of two adjacent, thick, curved, colored lines.

FIG. 10 shows the results for the first iteration using a straight (cylindrical) contacting surface. Interface 100 is illustrated at the bottom of FIG. 10 by two adjacent straight lines 102 and 104. Center portion 106 of these lines is in contact while lateral portions 108 are separated.

First Iteration:
    Surface is a flat, circular, cylinder.
    Tread Band thickness: 25−24=1 (constant)
    Tread Band interface nominal area: Pi*2*24*5=754.
    Nominal Shear stress at center of interface=~200.
    Peak shear stress at edge of interface=greater than 3000.

The graphed stresses in the upper portion of FIG. 10 show that the shear stress limit is exceeded beyond about middle ⅓ of the width. This design has relatively low shear stress at the centerline of the interface. However, further toward the edges the shear stress limit is exceeded; allowing separations to form at the interface.

FIG. 11 shows a doubly curved (parabolic/cylindrical) contacting surface. Interface shape 110 is illustrated at the bottom of FIG. 11 by two adjacent parabolically curved lines 112 and 114. Center portion 116 of these lines is in contact while lateral portions 118 are separated.

Intermediate Iteration:
    Surface is approximately a parabolically curved cylinder.
    Tread Band thickness: not constant.

Tread Band interface nominal area: greater than 754.

Nominal Shear stress at center of interface=~500.

Peak shear stress at edge of interface=greater than 2000.

The graphed stresses in the upper portion of FIG. 11 show that the shear stress limit is exceeded at about ¼ width. This design has higher peak shear stress at the centerline of the interface. However, further toward the edges, the shear stress limit is exceeded; allowing separations 118 to form at the interface.

FIG. 12 shows the result of the final iteration as a generally curved cylindrical contacting surface of this invention. Interface shape 120 is illustrated at the bottom of FIG. 12 by two adjacent curved lines 122 and 124. The curvature is different in center portion 126 relative to edge portions 128, and there is no portion sustaining shear separation.

Final Iteration:

Surface is a numerically specified, generally curved surface cylinder.

Tread Band thickness: not constant, much thicker at edges.

Tread Band interface nominal area: significantly more than 754.

Nominal Shear stress at center of interface=~700.

Peak shear stress at edge of interface=slightly less than 1000.

The graphed stresses in the upper portion of FIG. 12 show that the shear stress never exceeds the limit and separation does not occur. The shear stress in the center is higher than in the prior configurations, but the end portions never reach the shear stress limit within the width of the section. Separation will not occur when the interfacial shear stress never exceeds the material/adhesive limit.

Due to the required curvature of the interface described above, and various design factors for the tread, the resulting tread band may have a variable thickness. The tread band further comprises a tractive surface that may wear the surface material when in contact with a road and therefore may have a pattern for enhanced traction or wear. The tread band further comprises a hoop structure to provide additional support for the patterned wearing surface material.

Due to these multiple demands for vertical load, traction, and wear, placed upon the tread band, the tread band still further may comprise a mechanical interlock to provide additional attachment to the wheel of the tire. The mechanical interlock may comprise crenellated surfaces of the tire side walls engaging with mating surfaces at the edges of the tread band. In another embodiment, the mechanical interlock may comprise an interface of the tire side wall molded with a gear tooth interlocking configuration engaging the tread band. Also, the mechanical interlock may comprise a pressed fit between the surfaces of the tire side walls and the edges of the tread band. The mechanical interlock may be reinforced and strengthened by a chemical and/or adhesive means.

The method for producing this non-pneumatic tire uses a pair of disk-like side wall members. The process comprises the steps of: using a single sidewall mold to produce a first side wall member wherein the side wall further comprises a webbing; using the single side wall mold to produce a second side wall member wherein the side wall further comprises the same webbing as the first side wall member; and combining the first side wall with the second side wall to form a skew-symmetric assembly for the support structure of the tire. The method further comprises the steps of: assembling the two side wall members such that each has the same visual image as the other side wall when rotated about the axis of loading, i.e. "anti-symmetric" or "rotationally symmetric". The method still further comprises the step of: assembling the two side wall members with additional axial rotation in order to reduce irregularity in load support generated by web spacing.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A skew-symmetric, non-pneumatic tire rotatable about an axis comprising:

two copies of a single, molded, side wall portion for a non-pneumatic tire creating a skew-symmetric structure that is rimless;

a generally cylindrical hub surrounding the axis of rotation and a generally cylindrical outer surface sharing the common axis of rotation;

wherein the two copies are a pair of disk-like side wall members comprising non-buckling webs extending between and mating with the generally cylindrical hub and the generally cylindrical outer surface;

said pair of side wall members have webs sharing a common configuration resulting in an assembly with a skew-symmetric structure with respect to the loading direction;

wherein the assembly is configured such that the webbing of each side wall member has the same visual image as the other side wall when rotated about the axis of loading, i.e. "anti-symmetric" or "rotationally symmetric";

wherein the assembly is configured such that the webbing of each side wall member has an opposing configuration to that of the other side wall; and a tread-band circumscribing the cylindrical outer surfaces of the side walls.

2. A tire according to claim 1 wherein the non-buckling webs provide a tangential transition between inner and outer cylindrical surfaces to create a non-buckling structure with deforming web members.

3. A tire according to claim 1 wherein the assembly is configured such that the webs of each side wall member can twist on an axis of loading without buckling.

4. A tire according to claim 1 wherein the side wall members are assembled with an additional axial rotation in order to reduce irregularity in load support generated by the webs.

* * * * *